(12) United States Patent
Phatak

(10) Patent No.: US 7,103,617 B2
(45) Date of Patent: Sep. 5, 2006

(54) METHOD AND SYSTEM FOR USE OF STORAGE CACHING WITH A DISTRIBUTED FILE SYSTEM

(75) Inventor: Shirish Hemant Phatak, Somerset, NJ (US)

(73) Assignee: Tacit Networks, Inc., South Plainfield, NJ (US)

( * ) Notice: Subject to any disclaimer, the term of this patent is extended or adjusted under 35 U.S.C. 154(b) by 0 days.

(21) Appl. No.: 10/756,986

(22) Filed: Jan. 13, 2004

(65) Prior Publication Data

US 2004/0186861 A1    Sep. 23, 2004

Related U.S. Application Data

(60) Provisional application No. 60/440,750, filed on Jan. 17, 2003.

(51) Int. Cl.
*G06F 12/00* (2006.01)
*G06F 17/30* (2006.01)
*G06F 7/00* (2006.01)

(52) U.S. Cl. ............................. 707/201; 707/10; 707/8
(58) Field of Classification Search .................... 707/8, 707/10, 201
See application file for complete search history.

(56) References Cited

U.S. PATENT DOCUMENTS

| | | | | | |
|---|---|---|---|---|---|
| 5,452,447 | A | * | 9/1995 | Nelson et al. | 707/205 |
| 5,594,863 | A | * | 1/1997 | Stiles | 714/15 |
| 5,611,049 | A | * | 3/1997 | Pitts | 707/8 |
| 5,634,122 | A | * | 5/1997 | Loucks et al. | 707/8 |
| 5,689,706 | A | * | 11/1997 | Rao et al. | 707/201 |
| 5,706,435 | A | * | 1/1998 | Barbara et al. | 711/141 |
| 5,717,897 | A | * | 2/1998 | McCrory | 711/141 |
| 5,740,370 | A | * | 4/1998 | Battersby et al. | 709/219 |
| 5,805,809 | A | * | 9/1998 | Singh et al. | 709/203 |
| 5,864,837 | A | * | 1/1999 | Maimone | 707/1 |
| 5,878,218 | A | * | 3/1999 | Maddalozzo et al. | 709/213 |
| 5,881,229 | A | * | 3/1999 | Singh et al. | 709/203 |
| 6,012,085 | A | * | 1/2000 | Yohe et al. | 709/217 |
| 6,049,874 | A | * | 4/2000 | McClain et al. | 713/176 |
| 6,119,151 | A | * | 9/2000 | Cantrell et al. | 709/216 |
| 6,122,629 | A | * | 9/2000 | Walker et al. | 707/8 |
| 6,243,760 | B1 | * | 6/2001 | Armbruster et al. | 709/243 |
| 6,366,952 | B1 | | 4/2002 | Pitts | 709/217 |
| 6,397,307 | B1 | * | 5/2002 | Ohran | 711/161 |
| 6,453,404 | B1 | * | 9/2002 | Bereznyi et al. | 711/171 |
| 6,505,241 | B1 | | 1/2003 | Pitts | 709/218 |
| 6,587,921 | B1 | * | 7/2003 | Chiu et al. | 711/119 |
| 6,597,956 | B1 | * | 7/2003 | Aziz et al. | 700/3 |

(Continued)

OTHER PUBLICATIONS

Gray, C.G. and D.R. Cheriton "Leases: An Efficient Fault-Tolerant Mechanism for Distributed File Cache Consistency", Proceedings of the 12th ACM Symposium on Operating Systems Principles, pp. 202-210, Nov. 1989.*

(Continued)

*Primary Examiner*—Luke S Wassum
(74) *Attorney, Agent, or Firm*—Norris, McLaughlin & Marcus

(57) ABSTRACT

A storage caching method and system manages shared access to real time data files while maintaining data file coherency and consistency in a computer network including a plurality of remote computer workstations and at least one file server. The storage caching system is implemented by storage caches, which are associated with workstations, and a cache server, which is associated with a file server, where the storage caches and the cache server interface with a distributed file system to provide shared access to real time data files by remote workstations.

26 Claims, 10 Drawing Sheets

U.S. PATENT DOCUMENTS

| | | | | |
|---|---|---|---|---|
| 6,609,183 | B1* | 8/2003 | Ohran | 711/161 |
| 6,944,676 | B1* | 9/2005 | Armbruster et al. | 709/243 |
| 2001/0011300 | A1 | 8/2001 | Pitts | 709/218 |
| 2001/0016896 | A1 | 8/2001 | Pitts | 711/136 |
| 2001/0047482 | A1* | 11/2001 | Harris et al. | 713/200 |
| 2001/0052058 | A1* | 12/2001 | Ohran | 711/161 |
| 2002/0083111 | A1 | 6/2002 | Row et al. | 718/1 |
| 2002/0144068 | A1* | 10/2002 | Ohran | 711/161 |
| 2004/0260768 | A1* | 12/2004 | Mizuno | 709/203 |

OTHER PUBLICATIONS

Satyanarayanan, M. et al. "Code File System User and System Administrators Manual", Carnegie Mellon University, Aug. 1997.*

Braam, P.J. and P.A. Nelson "Removing Bottlenecks in Distributed Filesystems: Coda & InterMezzo as Examples", Proceeding of the Linux Expo 1999, May 1999.*

Braam, P.J., M. Callahan and P. Schwan "The InterMezzo File System", Proceedinsg of the Perl Conference 3, O'Reilly Open Source Convention, Aug. 1999.*

Phatak, S.H. and B.R. Badrinath "Data Pertitioning for Disconnected Client Server Databases", Proceedings of the 1st ACM International Workshop on Data Engineering and Wireless Mobile Access, pp. 102-109, 1999.*

Tierney, B.L. et al. "A Network-Aware Distributed Storage Cache for Data Intensive Environments", Proceedings of the 8th IEEE International Symposium on High Performance Distributed Computing, pp. 185-193, 1999.*

Braam, P.J. "InterMezzo: File Synchronization with InterSync", Carnegie Mellon University, Mar. 20, 2002.*

PCWebopaedia "What is Streaming?", downloaded from www.pcwebopaedia.com, Mar. 28, 2002.*

Tacit Networks, Inc. ("Tacit Networks Delivers LAN-Speed Access to Data over WANs") press release, Dec. 9, 2002.*

Carey, M.J., M.J. Franklin, M. Livny and E.J. Shekita "Data Caching Tradeoffs in Client-Server DBMS Architectures", Proceedings of the 1991 ACM Sigmod International Conference on Management of Data, Feb. 1991, pp. 357-366.*

Cox, A.L. and R.J. Fowler "Adaptive Cache Coherency for Detecting Migratory Shared Data", Proceedings of the 20th Annual International Symposium on Computer Architecture, 1993, pp. 98-108.*

Cortes, T., S. Girona and J. Labarta "Avoiding the Cache Coherence Problem in a Parallel/Distributed File System", Proceeidngs of the High-Performance Computing and Networking Conference, Apr. 1997, pp. 860-869.*

Cortes, T., S. Girona and J. Labarta "Design Issues of a Cooperative Cache with no Coherence Problems", Proceedings of the 5th Workshop on I/O in Parallel and Distributed Systems, Nov. 17, 1997, pp. 37-46.*

Wang, J. "A Survey of Web Caching Schemes for the Internet", ACM Sigcomm Computer Communication Review, vol. 29, No. 5, Oct. 1999, pp. 36-46.*

Wu, K-L and P.S. Yu "Local Replication for Proxy Web Caches with Hash Routing", Proceedings of CIKM '99, Nov. 1999, pp. 69-76.*

Luo, Q. et al. "Middle-Tier Database Caching for e-Business", Proceedings of the 2002 ACM Sigmod Conference, Jun. 4-6, 2002, pp. 600-611.*

* cited by examiner

METHOD AND SYSTEM FOR USE OF STORAGE CACHING WITH A DISTRIBUTED FILE SYSTEM

CROSS REFERENCE TO RELATED APPLICATION

This application claims the benefit of U.S. Provisional Application No. 60/440,750 filed Jan. 17, 2003, assigned to the assignee of this application and incorporated by reference herein.

FIELD OF THE INVENTION

The present invention relates generally to managing shared access to data files and, more particularly, to a storage caching protocol which provides authorized computer workstations with shared access to real time data files while maintaining data file consistency and coherence.

BACKGROUND OF THE INVENTION

In modern computer system and networking architectures, a computer system that is a repository for data files is typically not the computer system on which processing of the data files is performed. Consequently, a user at a computer workstation associated with a remote site computer system, such as a laptop computer, networked computer or desktop computer, often will desire to access, i.e., view (read) or modify (write), a data file that is stored in an internal memory, on a disk or in network attached storage of a remotely located central data source computer system. Such remote access of data files is performed over a communications channel, such as a data bus, a communications network or the Internet, which typically introduces a delay or latency in the presentation of the data file at the system accessing the data file. The latency is based on the need to transmit data between the system accessing the data file and the system that produces or stores the data file. In addition, the data file is usually accessed in portions or blocks rather than as a continuous stream, which exacerbates the latency because each block experiences the channel delay upon transmission.

In order to mitigate the effects of channel delays, most current computer systems that perform distributed file system applications, which provide for shared access to data files, implement some form of caching. In caching, a local copy of all or a portion of a data file, which is stored at a central source computer system, is maintained in a cache established at a remote system, such as in the local memory of a workstation associated with the remote system. The workstation can read or write to the cached data file, where the cached data file mirrors all or a portion of the data file stored at the central system. The cache also stores data that tracks any changes made to the cached data file, which are entered by the workstation and ultimately are to be incorporated into the data file stored at the file server. Thus, with caching, channel latency can be mitigated and a user of the workstation of the remote system is not aware that the data file is accessed from a local source rather than a remotely located central source system.

Although caching may reduce latency in certain data file access circumstances, if access to a data file which has not yet been stored as a copy (mirrored) in the cache is attempted, the latency associated with retrieving a copy of the data file from the file server, known as a cache miss, still exists. To avoid cache misses and consequently improve distributed file system performance, a caching system often implements a read-ahead technique, known as pre-populating the cache, in which data files that will be required for access in the future are stored in the cache.

In a distributed file system that provides for shared access to data files among a plurality of remote systems, the caching system that is implemented needs to maintain cache coherence and cache consistency to avoid different versions of a data file being accessed by different respective remote systems. Cache coherence is a guarantee that updates and the order of the updates to a cached data file are preserved and safe. Thus, in a coherent distributed file system, there is a guarantee that (i) a remote system does not delete the cached update data before the update data is used to update the corresponding data file stored at the file server, and (ii) no other system updates the data file in a manner that potentially can compromise the update of the data file until the data file at the server has been updated using the update data from the cache. Cache consistency is a guarantee that the updates to an opened, cached data file made by a workstation are reflected in the cached data file in a timely fashion.

The properties of cache coherence and cache consistency are equally important when multiple remote systems access the same data file. In this circumstance, coherence additionally ensures that updates on any cache corresponding to a data file stored at the file server do not override updates by another cache corresponding to the same data file. Cache consistency additionally ensures that updates to the cached data file made at any cache are, in a timely fashion, incorporated into the cached data file at any other cache which is accessing the same data file.

Cache consistency and cache coherence are easily maintained where a caching system includes a write-through architecture, which provides that all updates to the cached data file are immediately transmitted to the central computer system. This immediate transmission results in an immediate update of the data file stored at the file server of the central system. Although such architectures improve the performance associated with having multiple caches perform a read access of the data file from the central system, the latency associated with updating the data file based on write accesses still exists. Hence, this architecture typically only performs extremely well for a distributed file system where data file updates are infrequent.

Another caching architecture, known as write-back, evolved from the write-through architecture in an attempt to solve the latency problems of the latter. In a write-back architecture, a cache stores the updates to the cached data file for a period of time before transmitting (flushing) the cached updates to the central system. This periodic flushing updates the cached data file without significant latency. The simplest form of write-back is write-behind architecture, where the updates to the cached data file are not immediately, in other words after some delay, transmitted to the central source in the same order that the updates to the cached data file are stored on the cache. As cached updates are not immediately available to either the central source or other remote systems in write-back caching architectures, such architectures are mostly useful only when a single remote system will be accessing the data file for reading or writing.

If access to a data file by multiple remote systems is contemplated, the write-back caching system often is enhanced with mechanisms that track updates performed at all of the caches and also at the central source system to ensure consistency of data files. These mechanisms typically substantially increase the complexity and cost of the cache, so as to make such caches impractical in many applications. The performance benefits, however, are significant, which makes these caches very attractive for high performance computing implementations, such as computer systems connected over computer networks.

In a typical computer system architecture having file sharing capabilities, a local area computer network ("LAN") remotely accesses data files over a distributed file system, such as NFS® (Network File System) for UNIX™ or CIFS® (Common Internet File System) for Microsoft Windows™ systems. These file systems provide workstations associated with remote computer systems with a mechanism to access data files stored at a file server of a central computer system. In addition, each remote system utilizes local caching to increase efficiency of access to data files. Typically, the caching is performed at a granularity of pages of a data file that usually constitute four Kilobyte blocks of data. The actual number of pages cached is a function of the memory available for caching in a workstation that is incorporated in or coupled to a remote system. In addition, these file systems utilize some measure of write-back caching to achieve acceptable performance.

Although cache consistency and cache coherence are important properties for a caching system, these properties are often very difficult to realize in a networked computer system having distributed file system performance capabilities, especially if the system uses write-back caching. Thus, many distributed file systems do not completely satisfy the guarantees of cache consistency and coherence. In practical implementations, a distributed file system relies on a crucial assumption that sharing of the same data file is rare and, therefore, makes a trade-off between performance and correctness when sharing of a data file does occur. For example, NFS currently is not particularly suitable for shared access because (i) it has weak consistency guarantees, namely, modifications to a cached data file for a first remote system may not be timely reflected at the central system and, thus, would not necessarily be mirrored at another remote system accessing the data file from the central system; and (ii) it has no coherence guarantees. In addition, although CIFS provides excellent consistency and coherence, shared access is at low performance because the consistency and coherence is achieved by utilizing write-through any time that more than one remote system is accessing any given data file.

In addition to automatic measures for maintaining consistency and coherence, NFS and CIFS also provide locking mechanisms that allow a file sharing application to control coherence and consistency aspects. In particular, NFS allows sharing applications to voluntarily cooperate with each other without any operating system control, which is commonly known as advisory byte range locking. CIFS provides operating system controlled locking, known as mandatory byte range locking, as well as explicit file sharing modes, which, for example, permit an application to control the manner in which a file is accessed such that no other application can access the file. The file sharing application can use such mechanisms to improve the coherence and consistency properties provided by such prior art file distribution systems. For example, an application can use byte range locking to provide coherence and consistency even if the underlying system, e.g., NFS, does not have these properties.

Further, the performance issues faced by a networked system over a local area network, where typical latencies are well under a millisecond, are compounded when file sharing is performed over a wide area network ("WAN"). One prior art system, known as Transarc Andrew File System (AFS), was created to overcome the latency existing in WANs that are geographically small, such as a WAN of a university campus. In contrast to NFS and CIFS, which use local memory of the remote system, such as memory of a computer workstation, for storing pages of files, AFS uses an on-disk local file system as a cache for entire files. In AFS, most operations occur on the local copy of the file and there is no need to retrieve data from the file server when access to the data file is requested. As each cached data file is modified and closed, the updates are transmitted (flushed) to the central system to update the corresponding data file at the file server, and then such updated data file is made available for access by other remote sites.

Thus, AFS provides flush on close consistency at file granularity, in other words, updates to a data file are immediately available when the data file is closed, but not as it is being written. AFS, however, weakens the coherence and consistency guarantees considerably to make WAN operation feasible. In particular, AFS lacks coherence because it allows multiple remote systems to simultaneously update respective cached data files, each of which corresponds to a single data file, and provides that the last remote system that closes the file is the remote system that controls the changes to the data file at the server of the central system. In other words, the modifications of such last closing remote system supersede the changes apparently being made to the data file by other remote systems. In addition, the consistency of AFS is weak because modifications are transmitted to the central source only when a remote system closes the file.

Consequently, although AFS is useful for a campus wide sharing application, it has multiple disadvantages when implemented in a business enterprise environment. For example, AFS must be installed on all computers. In addition, AFS cannot be operated in conjunction with NFS and CIFS distributed file systems or other like systems which are conventional in the prior art. Furthermore, the lack of consistency and coherence of AFS makes it unsuitable for many enterprise applications that require multiple remote systems to have shared access to a real time version of a data file.

Therefore, a need exists for a system and method for providing real time, shared access to data files through use of a distributed file system, and where the system and method exploit the benefits of caching while also providing data file coherence and consistency and ease of interoperability and interfacing with an existing distributed file system.

SUMMARY OF THE INVENTION

In accordance with the present invention, a storage caching protocol system interfaces with a distributed file system to provide that authorized computer workstations have shared access to real time data files stored at a file server. A data file stored at the file server is automatically updated, in substantially real time, by a cache server to include file update data representative of data file modifications entered at a workstation and incorporated into a corresponding cached data file which is stored at a storage cache. Consequently, the cache server can respond to an access request for the data file from a workstation using a real time, updated version of the data file, where the real time data file includes all of the data file modifications which were entered by workstations that previously accessed the data file and incorporated into corresponding cached data files respectively stored at storage caches associated with the individual workstations. In a preferred embodiment, file update data is transmitted as streaming data to update the data file stored at the file server or a cached data file stored at a storage cache and, most preferably, the file update data is transmitted in compressed form and optionally generated using data differencing techniques.

In a preferred embodiment, the storage caching protocol system includes at least one storage cache and at least one cache server which are communicatively interconnected over a communications medium. The cache server is associated with a file server containing data files, and the storage cache is associated with at least one authorized computer workstation. The cache server transmits a copy of a data file stored at the file server to the storage cache. The storage cache stores the data file copy as a cached data file, and automatically transmits to the cache server file update data representative of modifications to the cached data file entered by a workstation associated with the storage cache and incorporated into the cached data file. The cache server uses the file update data to update the data file stored at the file server, and responds to subsequent access requests for the data file, such as from the same or another storage cache or an authorized computer workstation not associated with a storage cache, utilizing the updated version of the data file stored at the file server. In a preferred embodiment, the response to the access request includes server file update data for updating a corresponding cached data file stored at the requesting storage cache.

The inventive storage caching system preferably operates in accordance with a leasing protocol that manages requests for access to a data file to ensure consistency and coherence among all remote computer systems that share access to a data file through use of a distributed file system. Each time that a remote computer system associated with a storage cache desires to access, i.e., to view only (read) or to modify (write), a data file stored at the file server, the storage cache associated with the remote system determines if it has an appropriate lease for the data file and, if not, transmits a lease request to the cache server. The cache server grants the lease request if cache consistency and cache coherence with any other remote system including a storage cache that can access the data file can be preserved. If the cache server denies a lease request, the remote system can either prohibit the requested access or pass the request to the file server without caching the data file, as updates to a cached data file are not allowed. When the request is passed to the file server, the workstation from which an access request originated only has a right to view and cannot cache the data file, i.e., has a reader right, as another storage cache continues to have a write lease to the data file. Every time that a workstation associated with the storage cache is granted a reader right, the corresponding cached data file is updated using the data file stored at the file server, and the cached data file cannot be modified by the workstation.

In a further preferred embodiment, the cache server decides whether to grant or deny a request for a lease of a data file received from a first storage cache, based on (i) whether another storage cache already has a lease and the type of lease existing, which can be write or read, or (ii) whether the data file is already locked by some other mechanism, such as a mandatory or advisory lock associated with a prior art distributed file system protocol, such as CIFS and NFS. The lease request is processed based on the following criteria: a write lease cannot be granted if a read lease already exists at a second storage cache or the file is already locked for reading by another mechanism; only a pass through reader right can be granted if a write lease already exists at a second storage cache; and an additional read lease can be granted if a read lease already exists at a second storage cache or the file is only locked for reading. In addition, after a lease is granted, the cache server locks the data file to prevent another application from locking the data file in a conflicting fashion. Thus, the cache server ensures that any lease that is granted is compatible with an existing lease or any existing lock on the data file already taken by another mechanism. If a write lease is granted, the first storage cache autonomously updates the cached data file, based on data file modifications entered by an associated workstation, without intervention from the cache server. Further, following grant of a lease request or a reader right, the cache server and the first storage cache initially attend to automatically updating the cached data file, if any, stored at the first storage cache.

In another preferred embodiment, a storage cache responds to a request from an associated authorized workstation for access to a data file stored at the file server based on the strength of the lease, i.e., read lease or write lease, where a write lease is stronger than or includes file viewing rights associated with a read lease, if any, that the cache server has previously provided to the storage cache. The access request is granted where the access request, which can be read or write, is of a level commensurate with that of the existing lease, if any, for the storage cache. In addition, where the storage cache does not have an existing lease of sufficient strength to satisfy the access request, it must first obtain a lease and therefore requests a lease for the data file from the cache server. The lease request is granted if the cache server determines that a lease can be granted or that the requested access does not conflict with an existing lease of another storage cache as well as any existing locks on the data file. Following a grant of the lease request, the storage cache permits the cached data file to be opened at the workstation for read or write purposes, in accordance with the access request. If the lease request is denied, the storage cache interacts with the cache server to update the cached data file based on the version of the data file stored at the file server and only allows read access. The cached data file at the storage cache is automatically updated, as needed, based on interaction between the cache server and the storage cache. A storage cache typically releases or drops the lease only when all workstations associated with the storage cache have closed the cached data file and all pending updates to the data file, which are reflected in the cached data file, are transmitted from the storage cache to the cache server.

BRIEF DESCRIPTION OF THE DRAWINGS

Other objects and advantages of the present invention will be apparent from the following detailed description of the presently preferred embodiments, which description should be considered in conjunction with the accompanying drawings in which like references indicate similar elements and in which.

DETAILED DESCRIPTION OF THE INVENTION

Figure 1:
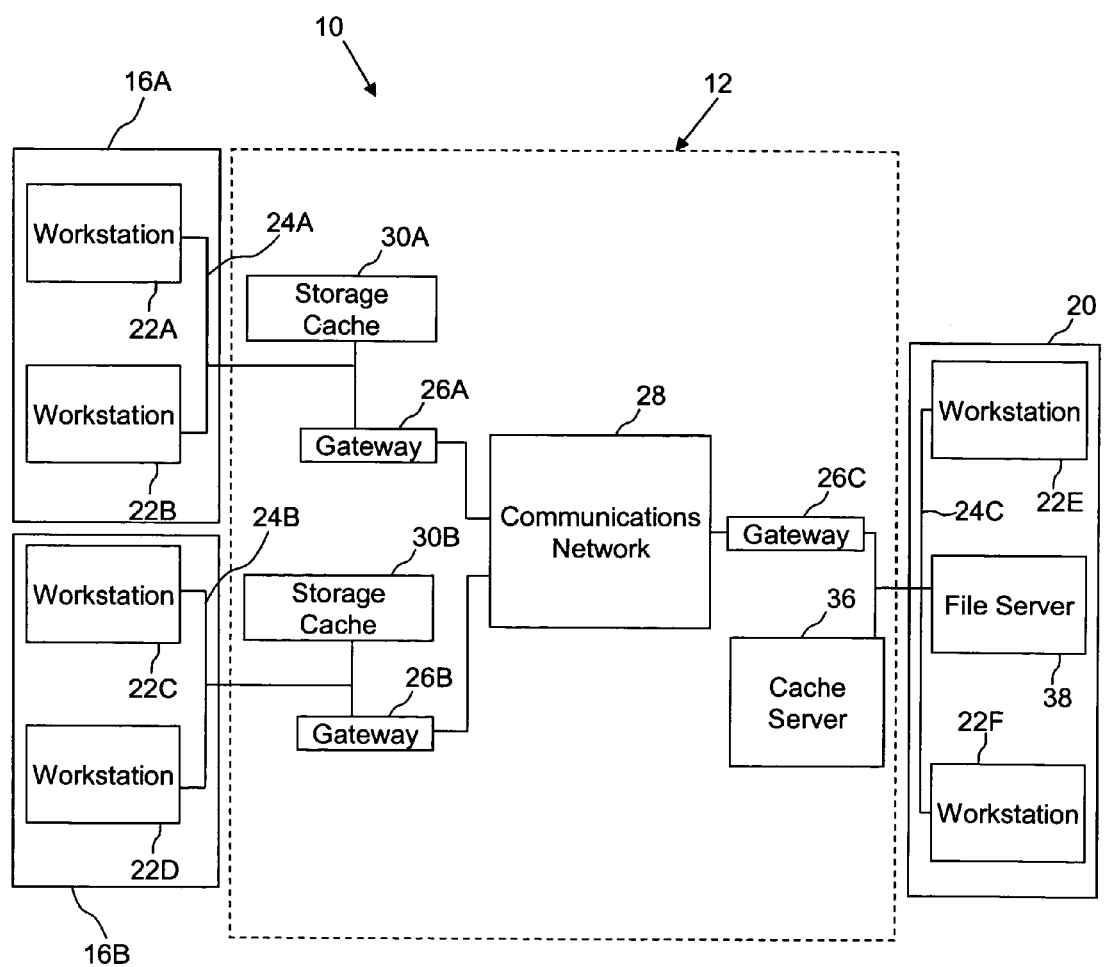
FIG. 1 is a system diagram illustrating implementation of a storage caching protocol in a distributed file system in accordance with the present invention.

FIG. 1 is a system diagram of an illustrative computer system network 10 which operates in accordance with the present invention of a storage caching protocol that provides multiple computer systems shared access to real time data files. The network 10 includes a storage caching protocol system 12 that interfaces with a distributed file system application operating at a data center computer system, which is a repository for data files, and a remote site computer system, which normally is located remotely from a data center system and is associated with a computer workstation that desires to access, i.e., view only (read) or modify (write), data files stored at a file server of a data center system. The inventive system 12 includes at least one storage cache, which is coupled to a workstation of an associated remote system, and at least one cache server, which is coupled to a file server of a data center system, where the storage cache and the cache server utilize a communications link, such as a link established over the Internet, to transfer (i) copies of data files that the associated workstation desires to access, (ii) file update data representative of on any data file modifications entered by authorized workstations that access the data file, and (iii) data associated with the operating features of the storage caching protocol system 12.

In the implementation of the storage caching protocol system 12 in the illustrative network 10 shown in FIG. 1, the system 12 interfaces with remote work group computer systems 16A and 16B and a central work group data center computer system 20. The remote system 16A includes computer workstations 22A and 22B interconnected over a communications channel 24A, such as an Ethernet or like medium. Similarly, the remote system 16B includes computer workstations 22C and 22D interconnected over a communications channel 24B. Each of the workstations 22 is part of or constitutes, for example, a personal computer, a personal digital assistant, or other like electronic device including a processor and memory and having communications capabilities. In addition, the workstations of a remote system, in combination with the Ethernet, form a local access network ("LAN") and operate in accordance with a conventional prior art distributed file system, such as NFS or CIFS, which provides that a user of a workstation can access data files located remotely from the remote system in which the workstation is contained.

A communications gateway 26 couples the Ethernet 24 of each of the remote systems 16 to a communications network 28. The network 28, for example, can be a wide area network ("WAN"), LAN, the Internet or any like means for providing data communications links between geographically disparate locations. The gateway 26, for example, is a standard VPN Internet connection having standard DSL speeds. As well known in the art, the gateway 26 provides that data, such as data files accessible in accordance with a prior art distributed file system such as NFS or CIFS, can be transferred between a workstation and a remotely located file server. It is noted that although the network 10 of FIG. 1 shows the gateway 26 and network 28 as being part of the storage caching system 12, these components, which constitute well known, prior art devices, do not constitute inventive features although they are required for operation of the storage cache and cache server of the inventive system 12, as described in further detail below.

Referring again to FIG. 1, the storage caching system 12 includes storage caches 30A and 30B which are associated with the remote systems 16A and 16B, respectively. Each storage cache 30 is coupled to the Ethernet 24 and the gateway 26 of the associated remote system 16. In addition, the storage caching system 12 includes a cache server 36. The cache server 36 is coupled to an associated gateway 26C which is also coupled to the network 28. An Ethernet 24C couples the gateway 26C and the cache server 36 to a file server 38 and workstations 22D and 22E contained in the data center system 20. The file server 38 is a conventional file storage device, such as a NAS, which is a repository for data files and provides for distribution of stored data files to authorized workstations in accordance with operation of conventional distributed file systems, such as NFS or CIFS, which are implemented at the authorized workstations of the remote systems 16 and the data center 20. For purposes of illustration, it is assumed that all of the workstations 22 in the remote systems 16 and in the data center 20 constitute authorized workstations and operate in accordance with a distributed file system compatible with that of the server 38.

Figure 2:
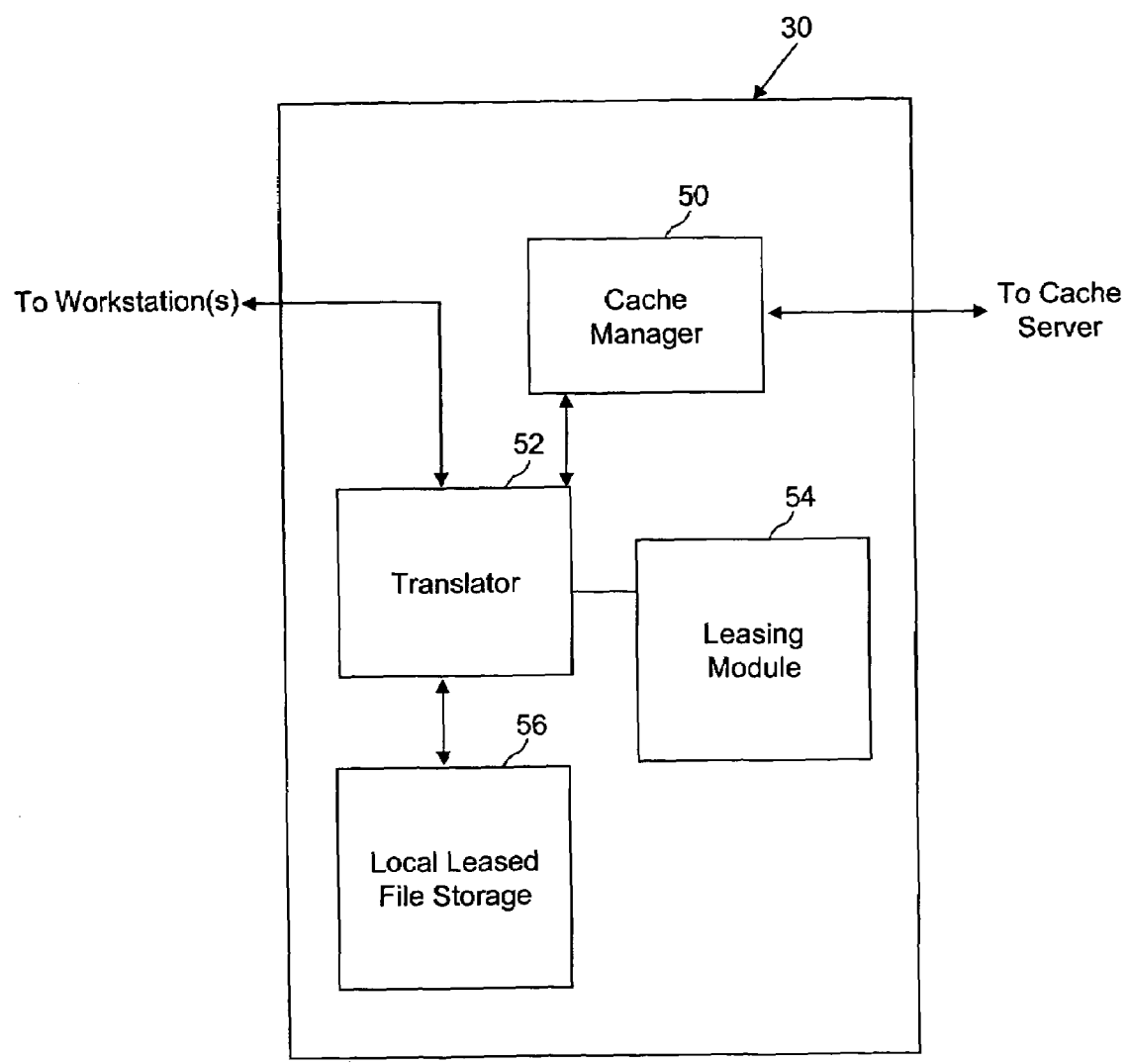
FIG. 2 is a block diagram of a storage cache in accordance with the present invention.

FIG. 2 is a preferred embodiment of the storage cache 30 in accordance with the present invention. Referring to FIG. 2, the storage cache 30 includes the modules of a cache manager 50, a translator 52, a leasing module 54, and a local leased file storage 56. The cache manager 50 is coupled to the translator 52 and is for coupling to a cache server, such as the cache server 36 as shown in FIG. 1, via gateways and a communications network. The translator 52 is coupled to the leasing module 54 and the local storage 56, and is for coupling to workstations of an associated remote system via an Ethernet connection. As explained in detail below, the cache manager 50 controls routing of data files, file update data and data file leasing information to and from the cache server 36. The translator 52 stores copies of accessed data files at the storage 56 as a cached data file, makes the cached data file available for reading or writing purposes to an associated workstation that requested access to a data file corresponding to the cached data file, and updates the cached data file based on data file modifications entered by the workstation or update data supplied from the cache server. In addition, the translator 52 preferably can generate a checksum representative of a first data file and determine the difference between another data file and the first data file based on the checksum using techniques that are well known in the art. The leasing module 54, through interactions with the cache server 36, determines whether to grant a request for access to a data file from an associated workstation, where the access request requires that the cached data file is made available to the associated workstation either for read or write purposes. In a preferred embodiment, a storage cache is associated with every remote computer system that can access a data file stored at a file server of a data center system over the network 28.

Figure 3:
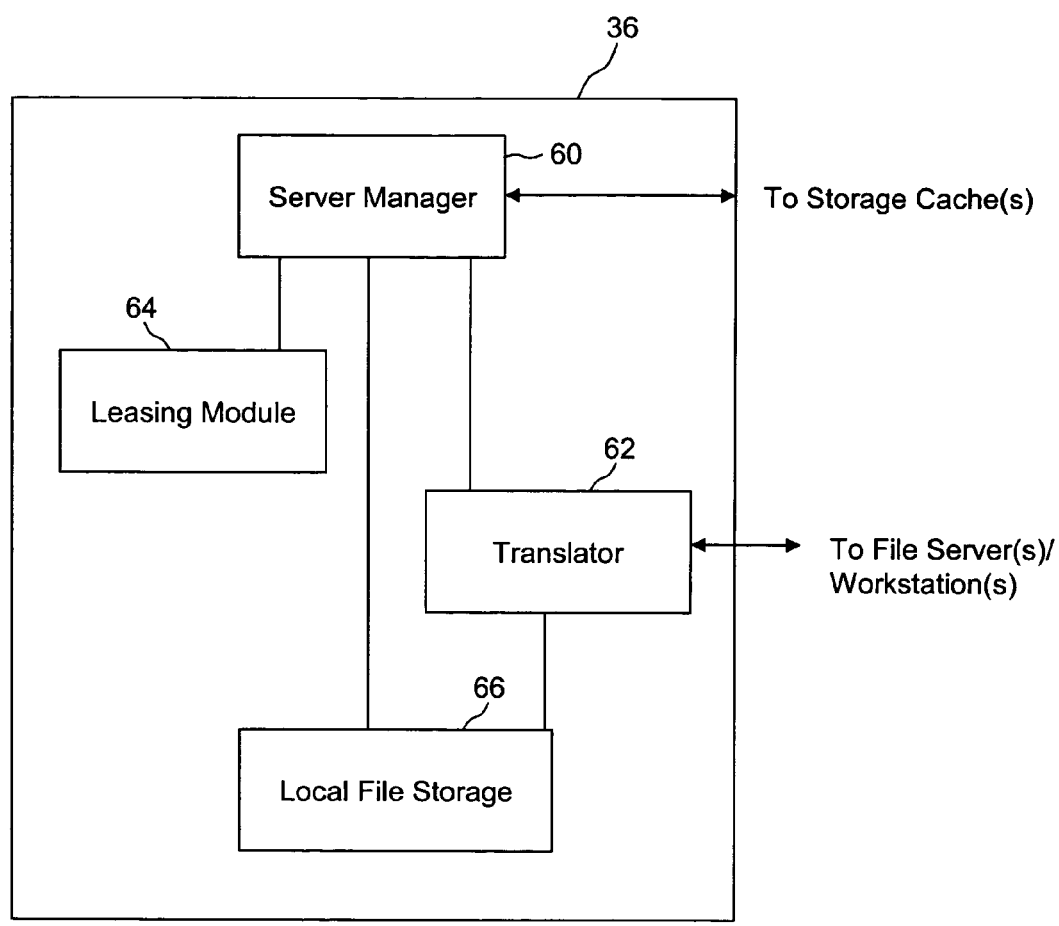
FIG. 3 is a block diagram of a cache server in accordance with the present invention.

FIG. 3 is a preferred embodiment of the cache server 36, in accordance with the present invention, that manages shared access to data files stored in the file server by multiple storage caches, such as the caches 30A and 308, and also by workstations, such as the workstations 22E and 22F of the data center 20, which are not associated with a storage cache. The cache server is preferably a thin appliance having an architecture that makes it compatible and easily integrated with an existing distributed file system, such as NAS and SAN, implemented at a remote computer system and a data center computer system. See U.S. Pat. No. 6,826,580 incorporated by reference herein.

Referring to FIG. 3, the cache server 36 includes the modules of a server manager 60, a translator 62, a leasing module 64, and a local file storage 66. The server manager 50 is coupled to the translator 62, the leasing module 64 and the storage 66 and also is for coupling to storage caches, such as the storage caches 30A and 30B, via the gateway 26C and the network 28. The translator 62 is coupled to the storage 66 and is for coupling to a file server of an associated data center computer system via an Ethernet connection. The translator 62 temporarily stores at the storage 66 copies of data files stored at and obtained from the file server 36, and performs processing using the stored data files and update data received from a storage cache to generate a replacement, updated data file. The translator 62 also replaces a data file stored in the file server 38 with the replacement data file. In addition, the translator 62 can supply to a workstation associated with the central system, such as the workstations 22D and 22E, a copy of a data file stored at the file server 36 only for viewing purposes in accordance with the inventive leasing protocol, described in further detail below. In a preferred embodiment, the translator 62, like the translator 52, can generate a checksum representative of a first data file and determine the difference between another data file and the first data file using the checksum. In addition, the leasing module 64, through interactions with the storage caches included in the system 12, determines whether a request for access to a data file from a workstation associated with a specific storage cache should be granted or denied.

It is to be understood that each of the modules of each of the storage cache 30 and the cache server 36, which perform data processing operations in accordance with the present invention, constitutes a software module or, alternatively, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. Further, it is to be understood that, in a preferred embodiment, the modules within each of the cache server 36 and the storage cache 30 can be combined, as suitable, into composite modules, and that the cache server and storage cache can be combined into a single appliance which can provide both caching for a workstation and real time updating of the data files stored at a file server of a central data center computer system.

In accordance with the present invention, the storage caches and the cache server of the storage caching system 12 provide that a data file stored in a file server of a data center, and available for distribution to authorized workstations via a conventional prior art distributed file system, can be accessed for read or write purposes by the workstations, that the workstations experience a minimum of latency when accessing the file, and that the cached data file supplied to a workstation in response to an access request corresponds to a real time version of the data file. A storage cache of the system 12 stores in the storage 56 only a current version of the cached data file corresponding to the data file that was the subject of an access request, where the single cached data file incorporates all of the data file modifications entered by a workstation associated with the storage cache while the file was accessed by the workstation. File update data associated with the cached data file is automatically, and preferably at predetermined intervals, generated and then transmitted (flushed) to the cache server. Most preferably, the file update data is flushed with sufficient frequency to provide that a real time, updated version of the data file is stored at the file server and can be used by the cache server to respond to an access request from another storage cache or a workstation not associated with a storage cache. In a preferred embodiment, the local storage 56 of the storage cache includes only cached data files corresponding to recently accessed data files.

Figure 4A:
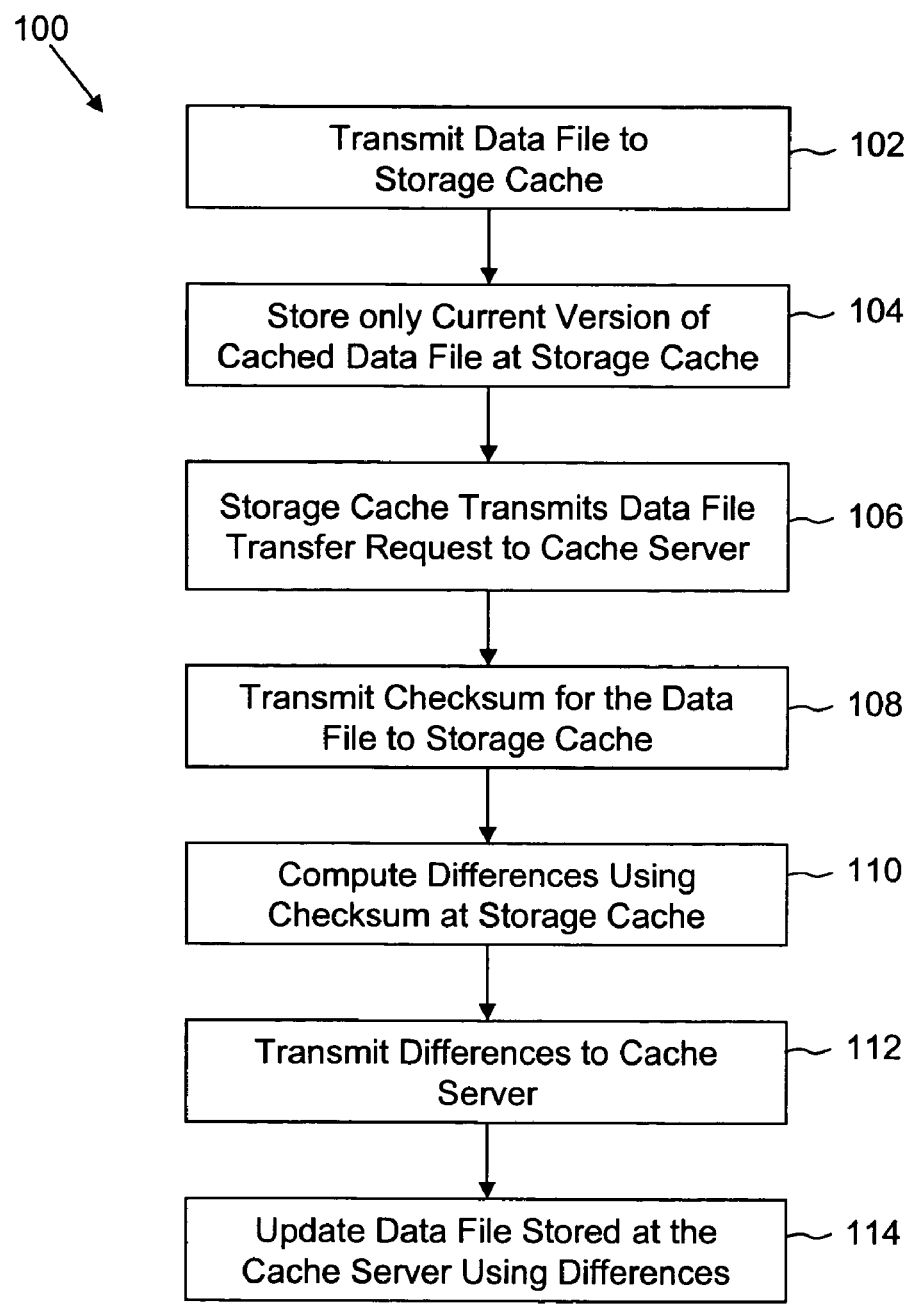
FIG. 4A is a flow diagram of a method for updating a data file stored at a file server based on the transmission of file update data from a storage cache to a cache server in accordance with the present invention.

FIG. 4A is a high level flow process 100 illustrating data processing operations performed at a storage cache and a cache server, in accordance with the present invention, for updating a data file at a file server. For purposes of illustrating the process 100, and also the processes described below with reference to FIGS. 4B, 5, 6, and 7, reference is made to the network 10 and operations that the components of the storage caching system 12 would perform in connection with requests for access to a data file from the remote system 16A or 16B where the data file is stored at the file server 36 of the source system 20. For highlighting the features of the process 100, it is assumed that the storage module 56 of the storage cache 30A does not initially contain a cached data file corresponding to a data file that the workstation 22A seeks to access for write purposes.

Referring to FIGS. 1, 2, 3 and 4A, in step 102, the translator 62 communicates with the file server 38 and generates a copy of the data file that the workstation 22A desires to access. The server manager 60 then transmits a copy of the data file to the storage cache 30A via the gateway 26C, the network 28 and the gateway 26A.

In step 104, The cache manager 50 receives the transmitted copy of the data file from the gateway 26A and stores the file in the storage 56 as a cached data file. In addition, the translator 52 interacts with the distributed file system of the workstation 22A to provide that the workstation 22A can open, and enter data file modifications to (write) the cached data file. When the user of the workstation is presented with the cached data file, in other words, the user is permitted to open the cached data file following a request for access for the corresponding data file, the user is not aware of the location in the network 10 from which the file was obtained. The user does not know whether he is working on a local copy of the data file, such as stored at a memory of the local remote system or at the storage cache 30A, or a copy of a data file retrieved from a remote storage location, such as the remotely located data center computer system 20. As the user enters data file modifications at the workstation 22A, the translator 52 monitors the modifications and incorporates these modifications into the cached data file at the storage

56. In other words, only a current version of the cached data file, which includes all modifications to the cached data file previously made by any workstation within the remote system 16A, is stored in the storage 56.

Steps 106, 108, 110, 112 and 114 set forth file update operations that the storage cache 26A and the cache server 26C automatically perform to update the version of the data file stored at the file server 38, based on the modifications made to the corresponding cached data file stored at the storage cache 26. Based on this automatic updating, the cache server can transmit a real time, updated version of the data file in response to a request for access to the data file received subsequently from an authorized workstation other than the workstation 22A, where the workstation may or may not be associated with a storage cache 30A or another storage cache that is part of the system 12. In the preferred illustrated embodiment of the process 100, the components of the system 12 implement the well known prior art technique of differencing as part of the inventive automatic updating of a data file to minimize potential latencies.

Referring again to FIG. 4A, in step 106, the cache manager 50 of the storage cache 30A transmits a data file transfer request to the cache server 36. At the cache server 36, the server manager 60, based on receipt of this request, causes the translator 62 to generate a checksum for the data file currently stored at the file server 38 using techniques well known in the art. The translator 62 generates the checksum by retrieving a copy of the data file from the file server 38 and storing data needed for checksum processing, such as the data file copy, in the storage 66, as necessary.

In step 108, the server manager 60 transmits the checksum to the storage cache 30A. In step 110, the cache manager 50 retrieves the cached data file from the storage 56 and the translator 52 uses the checksum to compute file update data, which is in the form of difference data. The difference data represents differences between the cached data file and the version of the data file currently stored at the file server and represented by the checksum.

In step 112, the cache manager 50 transmits the difference data to the cache server 36. Then in step 114, the translator 62 uses the difference data to generate an updated, replacement version of the data file. In particular, the translator 62 retrieves a copy of the current version of the data file, which preferably is stored in the local file storage 66 at step 108, and then processes the stored current version of the data file using the difference data to generate an updated data file. The translator 62 then replaces the data file currently stored at the file server 38 with the replacement, updated data file. Thus, when the cache server 36 subsequently receives a request for access to the data file transmitted from another storage cache, such as the storage cache 30, or from one of the workstations 22E or 22F in the data center system 20, the cache server 36 uses the updated data file to respond to the request. Consequently, the subsequent requestor effectively is presented with a real time version of the data file, which incorporates previous changes to the data file based on entries made at the workstation 16A.

In a preferred embodiment, in step 112 the cache manager 50 transmits the file update data as streaming data to the cache server 36. In an alternative preferred embodiment, the file update data is compressed before transmission to the cache server as streaming data to minimize the amount of data transferred over the network 28, thereby reducing potential latency.

In a preferred operation of the process 100, the cache server 36 continues to update a data file stored in the storage 66 based on file update data transmitted from a storage cache and, once transmission of all of the file update data is completed and the server cache has received all such transmitted data, the cache server then replaces the data file stored at the file server 36 with the updated data file.

Figure 4B:
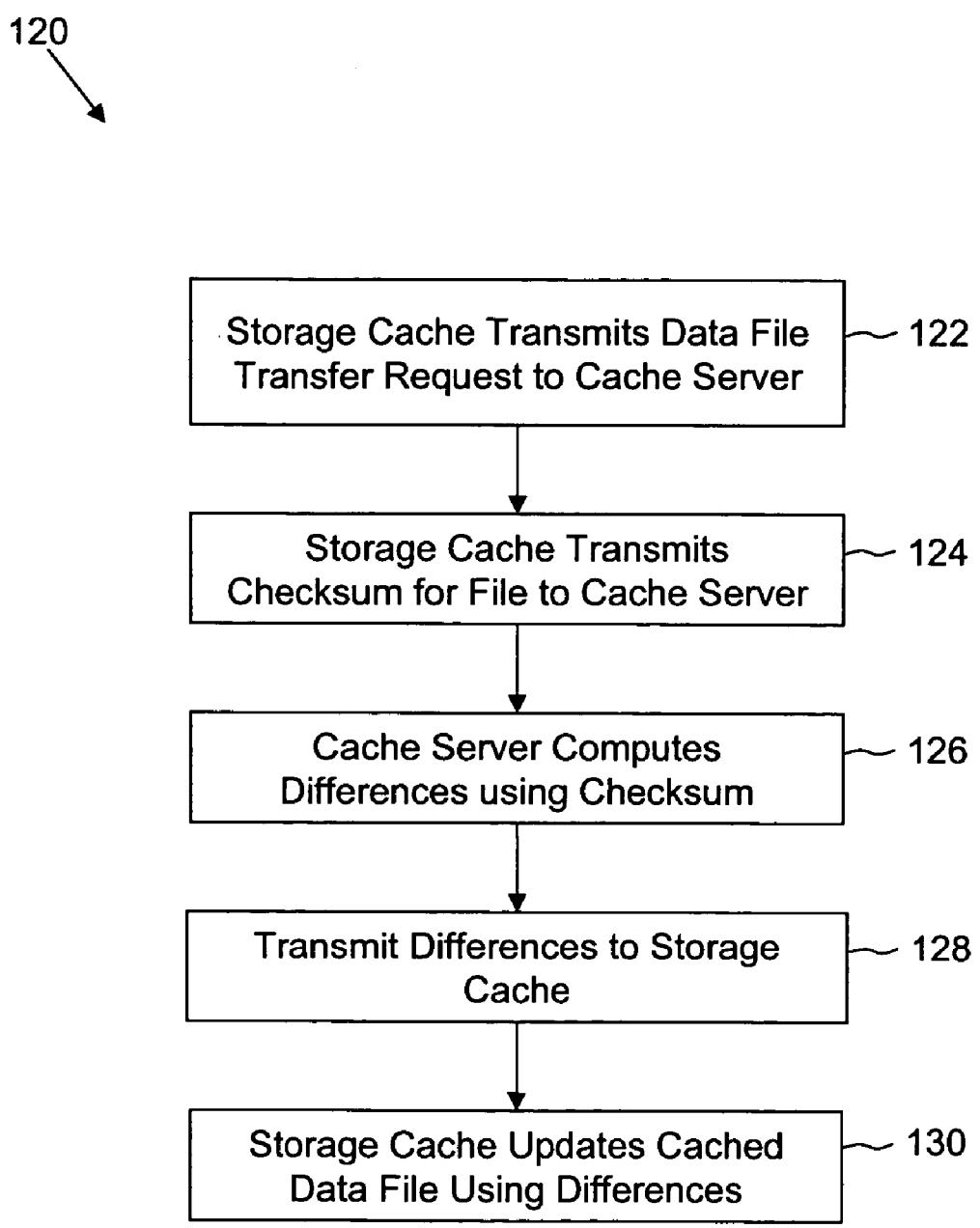
FIG. 4B is a flow diagram of a method for updating a cached data file stored at a storage cache based on server file update data transmitted by a cache server in accordance with the present invention.

FIG. 4B is a high level flow process 120 illustrating data processing operations that a storage cache and cache server perform, in accordance with the present invention, for updating a cached data file at a storage cache using the corresponding data file stored at the file server. For purposes of highlighting the features of the process 120, it is assumed that the storage cache 30A has received a request for access to a data file from the workstation 22A, a cached data file corresponding to the data file is stored at the storage module 56 and the workstation 22A or 22B previously accessed the data file for either read or write purposes. By updating the cached data file before it is presented to the workstation 22A in response to an access request, any updates made to the data file since the workstation 22A previously accessed the data file are incorporated into the cached data file. For example, the workstation 22C may have previously written to a cached data file at the storage cache 30B, which corresponds to the data file, and file update data representative of the modifications made to such cached data file may have been used to update the data file at the file server 36, as explained above in connection with the process 100, such that the data file at the file server 36 is different than the corresponding cached data file presently stored at the cache 30A.

Referring to FIG. 4B, in step 122 the cache manager 50, following receipt of the access request from the workstation 22A, and where it is assumed for simplicity that such access request would not impact coherence for the data file in the network 10, automatically transmits to the cache server 36 a data file transfer request. In response to the file transfer request, the translator 62 retrieves the data file from the file server 36 and the server manager 60 stores the data file in the storage 66.

In step 124, the translator 52 generates a checksum for the corresponding cached data file and the cache manager 50 transmits the checksum to the cache server 36. To compute the checksum, the translator 52 retrieves the cached data file from the storage module 56 and performs well known, prior art checksum processing on the cached data file.

In step 126, the translator 62 generates server file update data using the checksum. The server file update data preferably represents differences between the data file currently stored in the file server 36, a copy of which was stored in the storage 66 in step 122, and the current version of the cached data file stored at the storage cache 30A and represented by the checksum.

In step 128, the server manager 60 transmits the server file update data to the storage cache 30A. Then in step 130, the translator 52 uses the server file update data to generate an updated cached data file which replaces the cached data file stored in the storage module 56. Thereafter, the translator 52 uses the cached data file, which has been updated based on any other data file modifications made by other workstations associated with a storage cache of the system 12, to respond to the access request from the workstation 22A. Thus, user desired updates to an accessed data file are stored in the form of a single, current version cached data file at the storage 56 of a storage cache.

Similar to the process 100, the server file update data is preferably transmitted as streaming data to the storage cache and, in addition, the server file update data is most preferably compressed before transmission as streaming data to the storage cache.

In a preferred embodiment, the process 120 is automatically performed for a storage cache at predetermined intervals to provide that a cached data file is updated before a time that a workstation associated with the storage cache is expected to request access to the data file. For example, in an enterprise implementation of the inventive storage caching protocol system 12, the process 120 is automatically performed by a storage cache early in the morning, before employees would arrive at work and request access to data files from their workstations. In another preferred embodiment where none of the workstations of a remote system have accessed a particular data file for longer than a predetermined interval, the process 120 is automatically performed to update the corresponding cached data files at the storage cache to minimize latency. In a further preferred embodiment, all data files that workstations of a remote system would seek to access are initially stored at the storage cache associated with the remote system.

Thus, the inventive storage caching protocol system constitutes an invisible interface between a remote system and a data center system which manages shared access to real time data files. Advantageously, the changes that a workstation desires to make to a data file are not backed up at a storage cache. The desired changes are represented in the cached data file, and file update data which, is derived from the cached data file, is constantly transmitted to the cache server. The cache server, in turn, uses the file update data to update the data file stored at the file server of a data center system. Therefore, the remote system or a storage cache does not require a large amount of memory for local storage of files. Consequently, the installation of the inventive cache server in association with a central data center system provides memory saving benefits throughout the computer network 10 with a minimum of administrative overhead, as each of the remote systems associated with a storage cache which operates in conjunction with the cache server has a minimum of local memory storage requirements. This achieves minimal memory requirement. Unlike prior art file sharing systems, which are complete and separate systems, the inventive storage caching system has low memory requirements, is interoperable with existing distributed file system technology and, as discussed in detail below, also provides for network-wide coherence of shared data files when accessed by workstations. Further, the inventive storage caching protocol performs read and write shared access operations on an entire data file, which is markedly different from prior art operating systems, such as used by AFS, NFS and CIFS, each of which primarily performs read and write operations using portions (data blocks) of a data file.

Advantageously, the storage caching system 12 can be implemented in connection with an existing, prior art distributed file system, such as NFS or CIFS, without adding to or modifying software at appliances already existing at the remote systems or the data center systems and without impacting the existing software architecture. For example, the system 12 can appear as a Windows file server to a Windows users and a Unix file server to a Unix users. In addition, in operation, the storage cache and cache server of the system 12 are easily initialized to interface with workstations and a file server using conventional network configuration information. Further, after initial configuration of a storage cache, the storage cache does not require further administration, backup or management of any kind, such by a user of a workstation, and can be completely managed, monitored, provisioned and replicated from the cache server or a remote control center.

In accordance with a preferred aspect of the present invention, the system 12 implements a leasing protocol that ensures coherency and consistency of the real time data files available for shared access by workstations of the network 10 which operate using an existing distributed file system. The leasing protocol permits multiple read leases for a data file, where the first read lease for a data file locks the data file so that a write lease subsequently cannot be granted. In addition, following grant of a write lease for a data file, no other read leases can be granted until the write lease is closed. Further, where a write lease for a data file already exists, there can be multiple reader rights of the data file. A reader right to a data file provides that a workstation, which may or may not be associated with a storage cache, can view the data file as a copy, such as obtained directly from the file server, or in the form of a cached data file which is stored at a storage cache.

Figure 5:
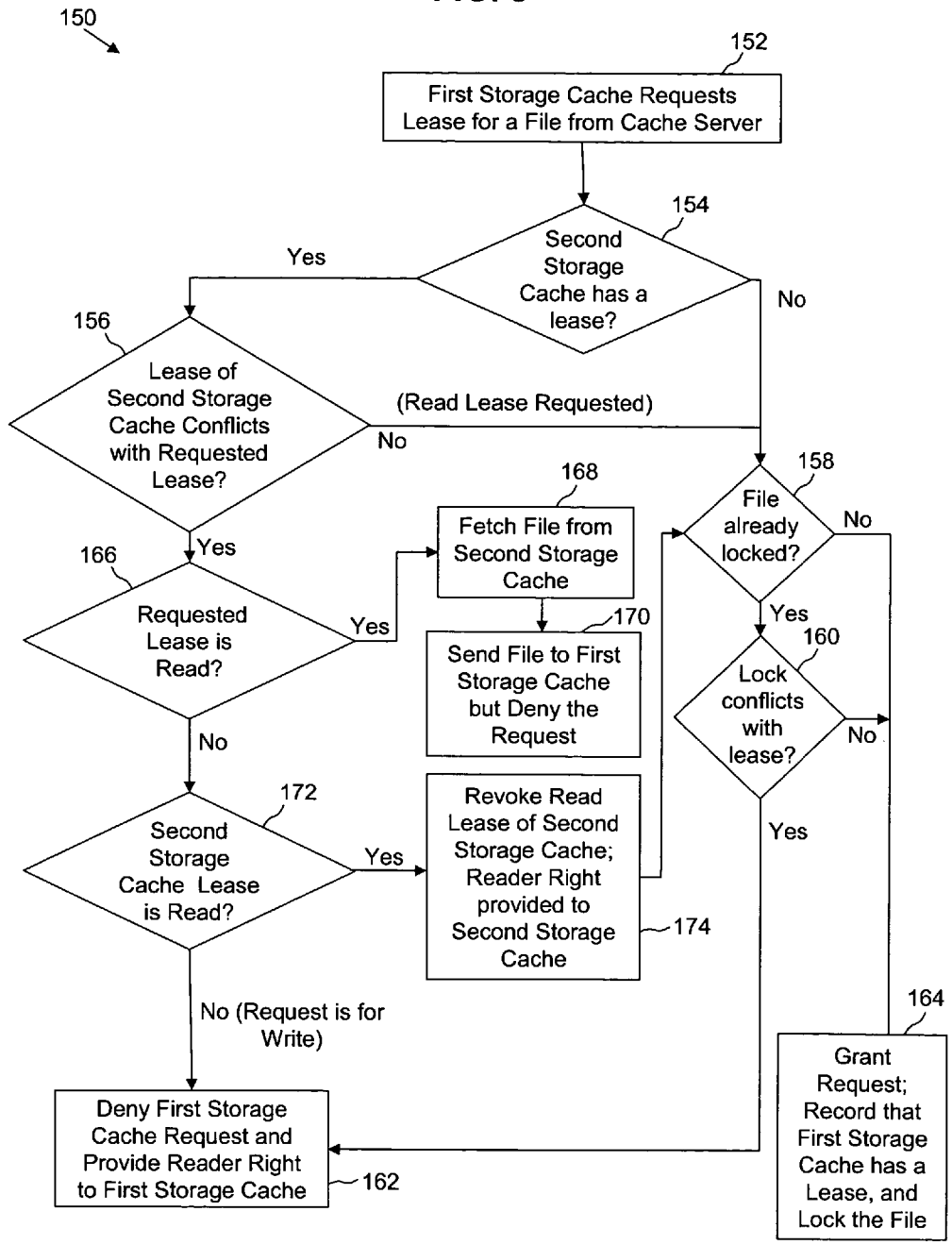
FIG. 5 is a flow diagram of a method for responding to a request for a lease from a storage cache in accordance with the present invention.

FIG. 5 is a high level flow process 150 illustrating data processing operations performed by a cache server and a storage cache, in accordance with the present invention, for determining whether to grant a storage cache's request for a lease of a data file. For purposes of highlighting the features of the leasing protocol set forth in the preferred process 150, it is assumed that a first storage cache, namely, the storage cache 30A, is initiating a lease request for a data file, which is stored at the file server 36, based on an access request received from the workstation 22A. In addition, for simplicity and clarity of description, it is also assumed that a second storage cache, namely, the storage cache 30B, is the only other storage cache in the network 10 that can be granted a lease for a data file. It is to be understood, however, the leasing process 150 is also applicable where the network 12 includes more than two storage caches and that the leasing process 150 would be performed in connection with each of the storage caches holding a lease for the data file at issue.

Referring to FIG. 5, in step 152 the leasing module 54 causes the cache manager 50 of the storage cache 30A to transmit a data file lease request to the cache server 36. In step 154, the leasing module 64 determines if the storage cache 30B already has a lease for the data file. If the determination in step 154 is yes, in step 156 the leasing module 64 determines if the lease held by the cache 30B conflicts with the requested lease. Based on the leasing protocol criteria, as described above, a conflict does not exist if the cache 30A lease request is read. In this circumstance, the leasing module performs step 158 to determine whether the file is already locked for read access based on distributed file system, such as CIFS or NFS, operations that control shared access to the file. If the determination in step 158 is that the data file is already locked, then in step 160 the leasing module 64 determines if the lock conflicts with the requested lease. A conflict would exist if (i) the lease request is a write lease and the existing lock is read or write lock, or (ii) if the lease request is a read lease and the existing lock is a write lock.

If the determination in step 160 is that a conflict exists, in step 162 the leasing module 64 denies the lease request and provides a reader right to the workstation seeking access to the data file. When reader rights are provided, the storage cache associated with the workstation performs the process 120 to update the cached data file, if any, corresponding to the data file that was the subject of the lease request transmitted by the storage cache 30A.

Referring to steps 158 and 160, if the determination for either of these steps is no, then in step 164 the leasing module 62 grants the request and records in its memory that the storage cache 30A has a lease and the type of lease and locks the file so that no other workstation attached to the storage cache 30B can have write access to the data file.

Referring again to step 154, if the determination for this step is no, the leasing module 64 proceeds to step 158.

Referring again to step 156, if there is a conflict, then in step 166 the leasing module 64 determines if the requested lease is read. If yes, in step 168 the server manager 60 updates the data file at the server 36 based on the cached data file stored at the cache 30B, preferably performing steps similar to the steps 108, 110, 112 and 114 of the process 100. If step 168 is performed, the cache 30B holds a write lease for the data file that is the subject of the lease request.

Following step 168, in step 170 the server manager 60 transmits a response to the cache manager 50 of the storage cache 30A that the lease request was denied and that the workstation can have reader rights to the data file. As part of the response, the server manager 60 transmits a copy of the data file to the storage cache 30A, or interacts with the storage 30A to update a corresponding cached data file stored at the storage cache 30A, preferably performing steps similar to the steps 124, 126, 128 and 130 of the process 120. The translator 52, in turn, supplies the cached data file, only with reader rights, to the workstation requesting access to the data file.

Referring again to step 166, if the determination is that the requested lease is not read, in step 172 the leasing module 64 determines whether the lease for the data file held by the storage cache 30B is read. If yes, the leasing module 64 in step 174 revokes the read lease of the storage cache 30B, stores such information in its memory for future use in making a leasing decision and transmits data representative of this action to the storage cache 30B so that its leasing module can update its memory and take appropriate action. Based on the revocation of the read lease, the storage cache 30B only can provide a reader right to an associated workstation that seeks to access the data file. In the circumstance where the storage cache 30B already has a read lease for the data file and an associated workstation is reading the file based on the read lease, the read viewing continues for the workstation and the user does not realize the changed status from read lease to reader rights. Step 158 is performed following step 174, as described above.

Alternatively, if the determination in step 172 is that the storage cache 30B lease is read, then step 162 is performed as described above. In this outcome, the requested lease was for write access.

Figure 6:
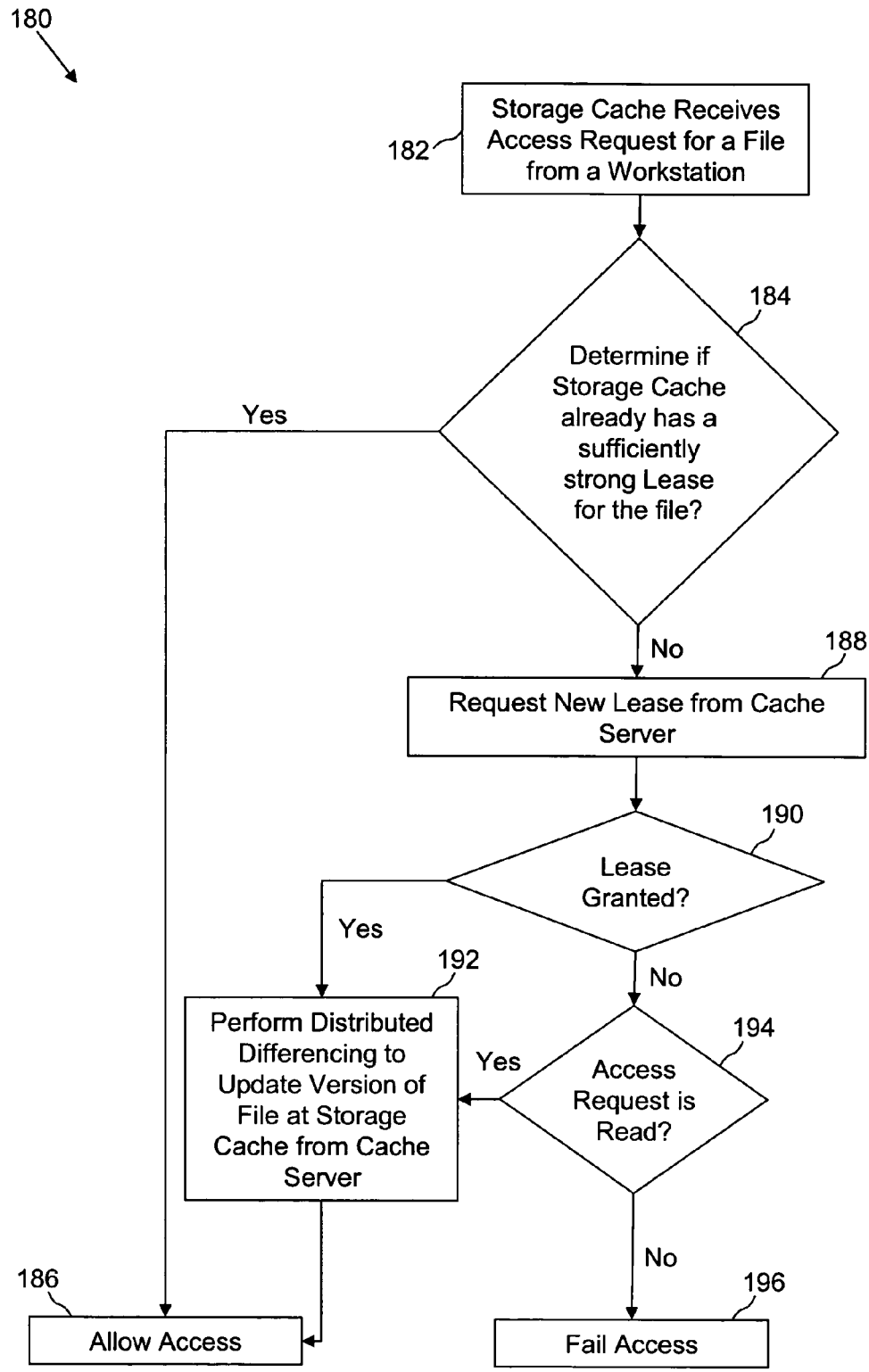
FIG. 6 is a flow diagram of a method for responding to a request for access to a data file received at a storage cache in accordance with the present invention.

FIG. 6 is a high level flow process 180 illustrating data processing operations performed by a storage cache and a cache server, in accordance with the present invention, for determining whether or not to grant a request by a workstation associated with a storage cache for access to a data file, where the request is for read or write purposes. For purposes of illustration, the workstation 22A is attempting to access a data file stored at the file server 36. Referring to FIG. 6, in step 182, the cache manager 50 of the storage cache 30A determines that the workstation 22A has made a request for access to a data file which is stored at the file server 36. In response to the access request, in step 184 the leasing module 54 determines if the storage cache 30A already has a sufficiently strong lease for the data file. Table 1 shows the relationship between a type of access request that has been made and the existing lease, if any, for a data file held by the storage cache. The entries in Table 1 indicate whether, based on a particular access request, the existing lease, if any, for a data file held by the storage cache is sufficiently strong such that data file consistency and coherency are preserved among the remote systems associated with respective storage caches.

TABLE 1

| | | EXISTING LEASE | | |
|---|---|---|---|---|
| | | Read | Write | No Lease |
| ACCESS REQUEST | Read | Yes | Yes | No |
| | Write | No | Yes | No |

If the existing lease is sufficiently strong in relation to the access request, in step 186 the translator 52 retrieves the cached data file from the storage 56 and transmits the cached data file to the workstation 22A over the Ethernet 24A. Consequently, a user at the workstation 22A can open the cached data file for read or write purposes, depending on the nature of the access request. For example, if the access request was write, the user can enter data file modifications for the cached data file, and the translator 52 would monitor the modifications, and automatically and on an ongoing basis, update the cached data file stored in the storage module 56 to incorporate such modifications.

If the determination in step 184 is that the existing lease is not strong enough in relation to the access request, in step 188 the leasing module 54 causes the cache manager 50 to transmit a new lease request to the cache server 36. Referring to Table 1, an existing lease is not strong enough if the intersection of the access request and the existing lease is a NO, e.g., the access request is write and the existing lease for the data file at the storage cache is read. Based on the new lease request, the cache server 36 performs a process that is the same or substantially similar to the process 150, as described above, to determine whether a lease can be granted. After the leasing module 64 determines whether and what type of lease can be granted, the server manager 60 transmits this information to the storage cache 30A.

In step 190, the leasing module 54 receives and processes the response to the lease request transmitted by the cache server 36 to determine whether a lease has been granted. If yes, in step 192, the cache manager 50 and translator 52 of the storage cache 30A perform a process, such as the process 120 described above, to update the corresponding cached data file in the storage module 56. The cache manager 50 then performs step 186.

If the determination in step 190 is that a lease has not been granted, in step 194 the leasing module 54 determines whether the access request was read. If yes, steps 192 and 186 are performed as described above, except that in step 186 read access to the cached data file is provided.

If the determination in step 194 is no, in step 196 the leasing module 54 prevents the cached data file from being accessed by the workstation 22A. This outcome ensures data file coherence and consistency throughout the network 10. Step 196 is performed where the access request was write and another read or write lease for the data file existed at another storage cache associated with the distributed file system, such as the storage cache 30B.

Figure 7:
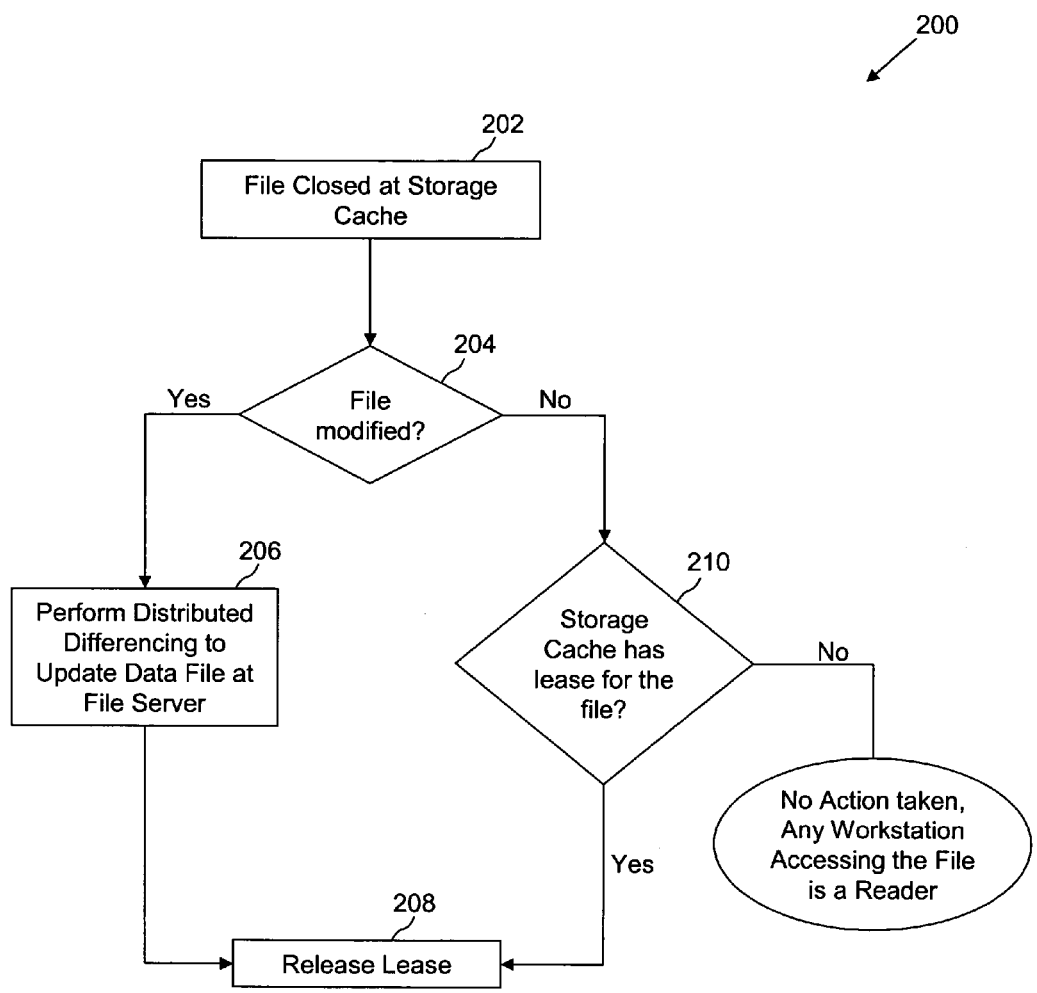
FIG. 7 is a flow diagram of a method for releasing a lease of a data file in accordance with the present invention.

FIG. 7 is a high level flow process 200 illustrating data processing operations performed by a storage cache and cache server, in accordance with the present invention, for updating a data file stored at a file server after a storage cache that has obtained a lease for the data file no longer needs to maintain the lease active. For purposes of highlighting the features of the process 200, it is assumed that only the workstation 22A of the remote system 16A previously obtained read or write access to the data file and the workstation 22A closed the accessed cached data file, which it had been viewing or modifying on its operating system and which corresponds to the data file for which the storage cache 30A holds a write lease or a read lease.

Referring to FIG. 7, in step 202, the cache manager 50 monitors data transmissions between the translator 52 and the workstation 22A to determine when the workstation 22A has closed the cached data file. After the cache manager 50 determines that the cached data file has been closed, in step 204 the translator 52 determines whether the workstation 22A modified the cached data file. If yes, in step 206 the translator 206 and the cache manager 50 perform a file update process, preferably including differencing data processing similar to that described in the process 100, to update the data file stored at the file server which corresponds the cached data file that was closed by the workstation 22A.

Following step 206, the leasing module 54, which also received the transmission indicating that the cached data file was closed, in step 208 causes the cache manager 50 to transmit a release lease signal for the data file to the cache server 36. Further in step 208, at the cache server 36, the leasing module 64, upon receipt of the release lease signal, resets its memory concerning the data file. If a write lease was released, the reset provides that another storage cache, such as the storage cache 30B, can obtain write lease access to the data file.

Referring again to step 204, if the determination is that the workstation 22A did not modify the cached data file while the workstation had access to the cached data file, then in step 210 the leasing module 54 determines whether the storage cache 30A holds a lease for the corresponding data file. If yes, which means that the cache 30A had a read lease for the data file, the leasing module 54 performs step 208. Alternatively, if the storage cache 30A did not have a lease for the data file, no further action is taken because the workstation 22A that opened the file was a reader, Le., could only read the file, and another storage cache, such as the storage cache 30B, had obtained write access rights for an associated workstation.

Thus, the inventive storage caching system manages data files of a distributed file system to make them available for coherent and consistent shared real time access by multiple remote systems. The data files can be accessed by users, who may be located at different remote locations, and are presented to the users in the form of a cached data file or a copy of the data file currently stored at the file server, each of which includes all previous modifications so as to constitute a real time, updated version of the data file. The preferred transmission of file update data and data files between a storage cache and a cache server as compressed, streaming data provides that a user at a workstation experiences substantially LAN-speed access to a data file, although the data file may be physically stored at a file server located remotely from the workstation.

Figure 8:
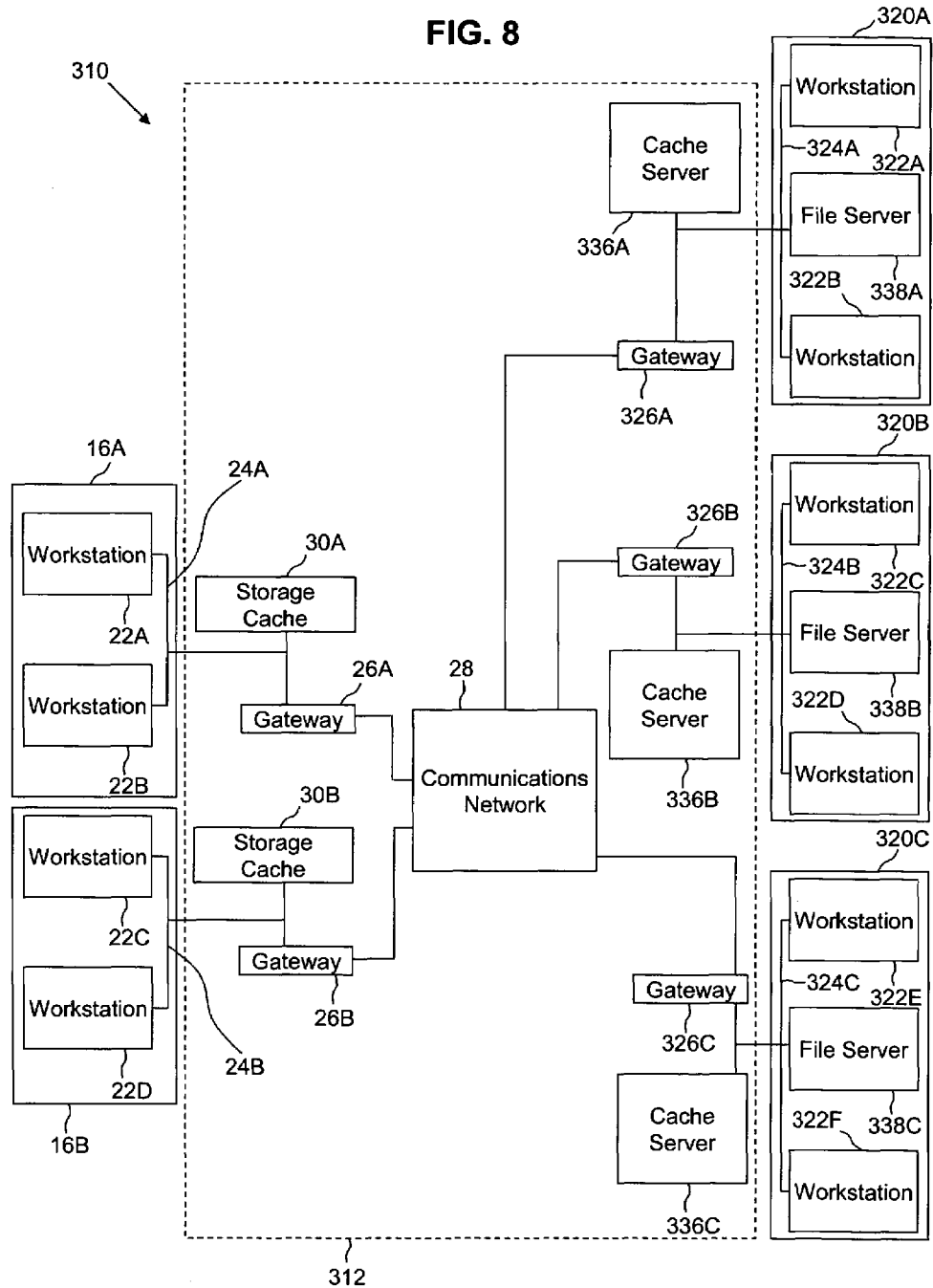
FIG. 8 is a system diagram illustrating implementation of a storage caching protocol in a distributed file system having a plurality of file servers in accordance with the present invention.

In accordance with a preferred embodiment of the present inventive storage caching protocol system including a leasing protocol, a workstation associated with a storage cache can access data files stored at multiple file servers. FIG. 8 is a system diagram of a network 310 including a preferred storage caching protocol system 312 which operates to manage access to shared real time data files which are stored at multiple file servers and to maintain data file coherence and consistency in the network 310 in accordance with the present invention. Referring to FIG. 8, the system 312 includes a plurality of cache servers 336A, 336B and 336C, which are respectively coupled to associated data center systems 320A, 320B and 320C, and also storage caches 30A and 30B, which are respectively coupled to the remote systems 16A and 16B in the same manner as described above for the network 10. For purposes of illustration, each of the data centers 320 is constructed and functions in the same or substantially the same manner as the data center 20 in the network 10. For example, the data center 320A includes an Ethernet 324A which couples workstations 322A and 322B and a file server 338A to the cache server 336A and a gateway 326A, and the gateway 326A is coupled to the communications network 28.

Referring to FIG. 8, each of the storage caches 30 can communicate with any of the cache servers 336, which are likely located at different remote locations, and vice versa. In addition, the cache servers 336 can communicate with respective associated file servers 338 for retrieving copies of and updating data files that are the subject of access requests from any of the storage caches 30, in accordance with the inventive storage caching protocol. Advantageously, the inventive cache server has a software infrastructure to act as a client for standard LAN file sharing protocols (NFS and CIFS), which makes it readily configurable to retrieve copies of a data file from or replace data files stored at any of the file servers 338 in the network 310, where each of the file servers 338 can have any operating system format. In addition, the cache server can also access files from and replace files on a local file system using standard file system APIs.

In operation of the system 312, when a workstation desires to access a data file for read or write purposes, and the inventive storage caching system correctly multiplexes an access request to the appropriate cache server, the location from which a copy of the data file is presented to the user is unknown to the user at the workstation. In other words, a user can access and operate on a sharable data file without knowing, being concerned with or ascertaining which data source system physically contains the data file.

In a further preferred embodiment, each storage cache or server cache can be constructed to operate as both a storage cache and cache server. Thus, a single combination storage cache and cache server appliance can be associated with a remote computer system or a data center computer system. The user at a workstation of an associated remote system would not be aware that, in some circumstances, the storage cache communicates with a cache server that is within the same appliance.

Further, the inventive storage caching protocol system provides tremendous flexibility in the allocation and sharing of file server and memory resources, as storage caches and cache servers can serve as simple building blocks for implementing very sophisticated topologies, such as cliques where every cache/server combination is connected with every other cache/server combination in the network.

Figure 9:
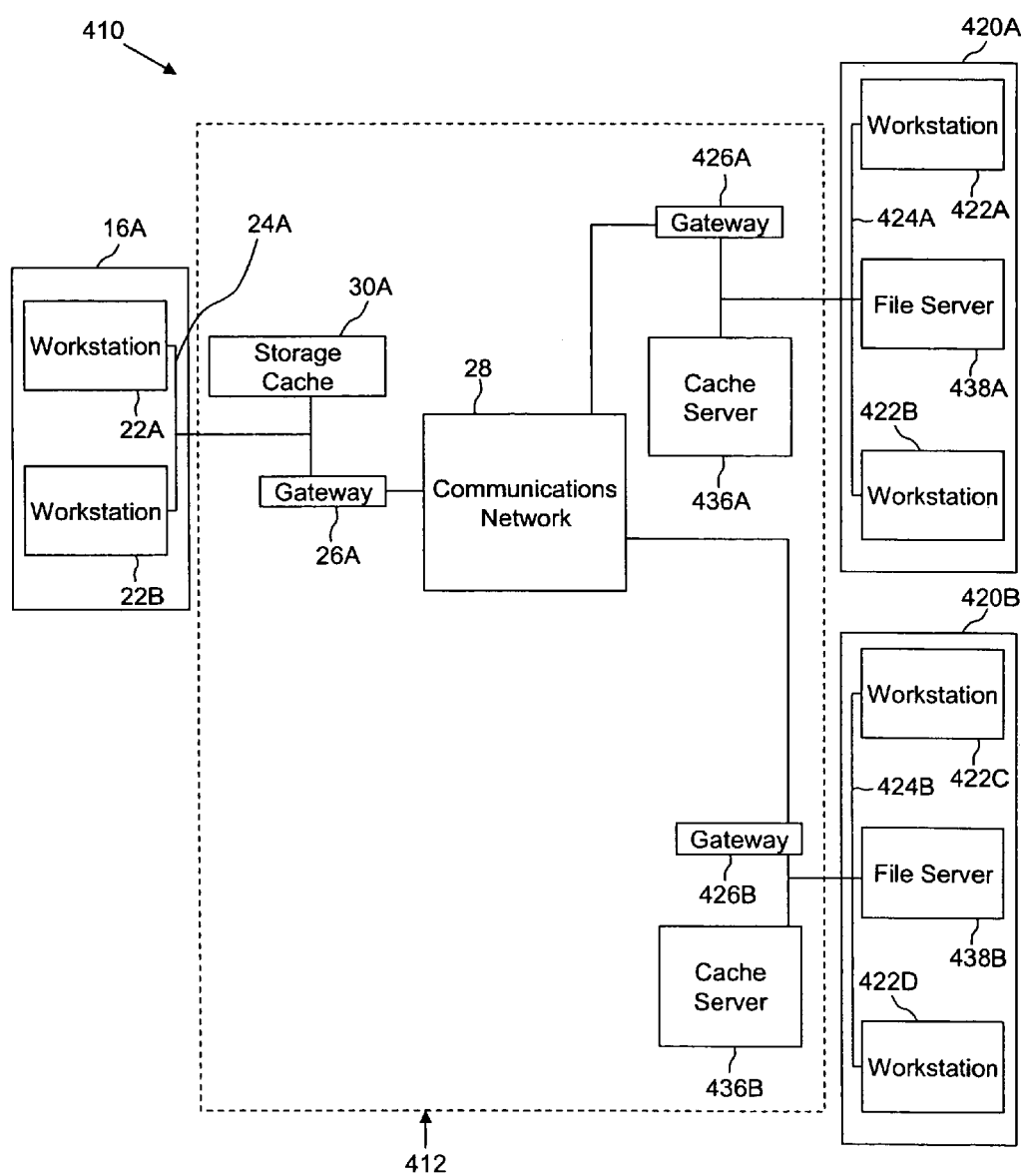
FIG. 9 is a system diagram illustrating implementation of a storage caching protocol in a distributed file system to provide for data backup in accordance with the present invention.

In a further preferred embodiment, the inventive storage caching system including the leasing protocol uses the cached data file stored at a storage cache and being modified by entries by the workstation, the version of the data file stored at the storage of the cache server or the data file stored at the file server to update a data file or a cached data file and maintain data file coherency and consistency in a network in the event of (i) a disconnection of a communication link established between a cache server and a storage cache, (ii) a failure of either the cache server or the storage cache, or (iii) an unexpected reboot of a workstation. Significantly, additional data for tracking file update status is not required. FIG. 9 is a system diagram of a network 410 including a further preferred embodiment of a storage caching protocol system 412 which manages shared access to real time data files while maintaining data file coherence and consistency and also backing up data files in accordance with the present invention. Referring to FIG. 9, the system 412 includes cache servers 436A and 436B, which are respectively coupled to associated data center systems 420A and 420B, and a storage cache 30A which is coupled to the remote system 16A in the same manner as in the network 10. For purposes of illustration, each of the data center systems 420 is constructed and operates in substantially the same manner as the data center 20 of the network 10. To highlight the back-up protocol features, it is assumed that a communications link between the storage cache 30A and the cache server 436A has been established for transmitting file update data to the cache server 436 based on modifications being made to a cached data file at the storage cache 30A, where the cached data file corresponds to a data file stored at the file server 438A, and where the file server 438A, which is a primary data file storage facility for the system 410 and the file server 438B is the back-up storage facility.

Referring to FIG. 9, the backing-up of data files in accordance with the present invention is initiated when the cache manager 50 of the storage cache 30A detects, for example, a network communication failure at the gateway 26. In turn, the cache manager 50 automatically and periodically attempts to reestablish a communications link to the cache server 436A. The storage cache 30A also continues to operate without interruption, i.e., continues to monitor modifications to the cached data file entered by a workstation and stores only the current version of the cached data file, incorporating the modifications, in the storage 56.

Further, the cache manager 50 simultaneously attempts to establish a communications link with a back-up data center, such as the data center 420B, via the cache server 436B, as the cache servers 436A and 436B have different and unique IP routing addresses. If this back-up link can be established, the storage cache 30A proceeds to perform the process 100 for updating a back-up copy of the data file stored at the file server 420B. In other words, the storage cache 30A continues the process of updating of the data file at the cache server 436B at the point where the disconnection to the cache server 436A occurred, assuming the data centers are mirrored.

When a connection is re-established to the cache server 436A following a disconnection, the storage cache 30A resumes the process for updating the data file by performing, for example, the steps 106, 108, 110, 112 and 114 of the process 100. In other words, a checksum representing the version of the data file existing at the cache server 436A or the file server 438A at the time the disconnection occurred is used to compute the difference data in step 110. Therefore, the storage cache 30A effectively always maintains the file update data, because only a current version of the cached data file is stored and this current cached data file is used to update the version of the data file at the file server based on the checksum transmitted from the cache server. Thus, as the cached data file continues to be updated and is used to update the data file currently stored at the file server, the storage caching protocol system advantageously provides that the exact status of updating of the data file prior to the disconnection need not be tracked or known.

Consequently, the storage cache can interact with multiple cache servers and easily can establish a communications link with the cache server of a back-up data center, should a communications link to the cache server of the primary data center fail. The end user at a workstation, however, does not experience or realize the disruption to the communications link when the primary data center fails, while attempts are made to re-establish a link to the primary data center or to a new link to the back-up data center and when the link is finally re-established to the primary data center. The previous state of the data file is automatically restored from the memory in a storage cache or cache server to ensure that coherency is always maintained and pending write-back data is not lost in the case of reboots or system restarts, In a preferred embodiment of the inventive storage caching system including the leasing protocol, a combination of streaming (for read-ahead), compression and differencing for better channel utilization is performed to make a cache hit extremely likely, enable substantial write behind and make a cache miss as efficient as possible.

In a further preferred embodiment, the storage cache can attempt to establish communication links at multiple IP addresses for the same data center on different carriers when a network failure is experienced.

In another preferred embodiment, after a failure occurs at a storage cache, the failed storage cache is simply replaced and the new storage cache promptly establishes a connection with the cache server at the remote data center and immediately resumes caching and updating in accordance with the processes 100 and 120.

Although preferred embodiments of the present invention have been described and illustrated, it will be apparent to those skilled in the art that various modifications may be made without departing from the principles of the invention.

What is claimed is:

1. A method for managing shared access to data files stored in a file server by a plurality of authorized computer workstations, the method comprising:
   supplying to a first storage cache a copy of a data file retrieved from the file server by a cache server for reading or updating, wherein the first storage cache is associated with a plurality of first authorized computer workstations and stores the copy of the data file as a cached data file;
   at the first storage cache, incorporating data file modifications entered by any of the first workstations into the cached data file as the modifications are entered, such that the cached data file is a current version;
   automatically transmitting file update data from the first storage cache to the cache server, wherein the file update data is a function of the modifications incorporated into the cached data file which make the cached data file the current version; and
   at the cache server, generating a replacement version of the data file stored at the file server based on the file update data.

2. The method of claim 1 further comprising:
   at the cache server, if the file is accessed for updating by the first storage cache, protecting the data file stored at the file server from updates from other storage caches until all file update data from the first storage cache has been incorporated into the replacement version of the data file and the replacement version has replaced the data file stored at the file server.

3. The method of claim 2, wherein the protecting comprises protecting the data file stored at the file server from updates from other storage caches while the file update data from the first storage cache is transmitted to the cache server.

4. The method of claim 1 further comprising:
   replacing the data file stored at the file server with the replacement version of the data file; and
   responding to a request for access to the data file subsequently transmitted to the cache server from at least one of a second storage cache and an authorized computer workstation using the replacement version of the data file.

5. The method of claim 1, wherein the file update data is transmitted as streaming data to the cache server.

6. The method of claim 1 further comprising:
compressing the file update data prior to transmission to the cache server.

7. The method of claim 1, wherein the file update data includes difference data, wherein the difference data represents the difference between the cache data file at the first storage cache and the version of the data file currently stored at the file server or the cache server.

8. The method of claim 1, wherein the cache server includes a plurality of cache servers and wherein a replacement version of the data file is generated at least one of the cache servers.

9. The method of claim 8, wherein when a communications connection between a first of the sub-cache servers and the first storage cache fails, the first storage cache automatically attempts to establish a communications connection with at least one of the first sub-cache server and a second of the cache servers.

10. The method of claim 1, wherein the file update data is automatically transmitted to the cache server at predetermined intervals.

11. A method for managing shared access to data files stored in a file server by a plurality of authorized computer workstations, the method comprising:
automatically transmitting file update data from a cache server to a first storage cache in response to a workstation request for access to a data file which is stored at a fiie server associated with the cache server, wherein the first storage cache is associated with a plurality of first authorized workstations, and wherein the file update data is a function of differences between the data file as currently stored at the file server or the cache server and a cached data file stored at the first storage cache and corresponding to the data file;
incorporating the file update data into the cached data file at the first storage cache such that the cached data file is updated to be the same as the data file currently stored at the file server or the cache server;
at the first storage cache, incorporating data file modifications entered by any of the first workstations into the cached data file as the modifications are entered, such that the cached data file is a current version; and
automatically transmitting file update data from the first storage cache to the cache server, wherein the file update data is a function of the modifications incorporated into the cached data file which make the cached data file the current version.

12. The method of claim 11, wherein the file update data is transmitted as streaming data to the first storage cache.

13. The method of claim 11 further comprising:
compressing the file update data prior to transmission to the first storage cache.

14. The method of claim 11, wherein the automatically transmitting and the incorporating the file update data steps are performed at predetermined intervals.

15. A system for managing shared access to data files stored in a file server by a plurality of authorized computer workstations, the system comprising:
a cache server for retrieving a copy of a data file stored at the file server;
at least a first storage cache for associating with a plurality of first authorized computer workstations, wherein the first storage cache stores in a local memory the retrieved data file copy as a cached data file and incorporates data file modifications entered by any of the first workstations into the cached data file as the modifications are entered, such that the cached data file is a current version;
wherein the first storage cache automatically generates and transmits file update data to the cache server as streaming data, wherein the file update data is a function of the modifications incorporated into the cached data file which make the cached data file the current version; and
wherein the cache server generates a replacement version of the data file based on the file update data and responds to a request for access to the data file subsequently transmitted to the cache server from at least one of a second storage cache and an authorized computer workstation using the replacement version of the data file.

16. The system of claim 15, wherein the cache server generates server update file data representative of differences between the cached data file stored at the first storage cache and the version of the data file currently stored at the file server, and wherein the cache server automatically transmits the server file update data to the first storage cache in response to a data file request transmitted by the first storage cache.

17. A system for managing shared access to data files stored in a file server by a plurality of authorized computer workstations, the system comprising:
a cache server for coupling to the file server;
a plurality of storage caches for accessing data files stored in the file server by establishing a communications connection with the cache server,
wherein each of the storage caches is for associating with a plurality of workstations and incorporates data file modifications entered by any of the corresponding associated workstations into the cached data file as the modifications are entered, such that the cached data file is a current version;
wherein each of the storage caches automatically transmits file update data to the cache server, wherein the file update data is a function of the modifications incorporated into the cached data file at the storage cache which make the cached data file the current version; and
wherein the cache server includes a leasing module, wherein the leasing module decides whether to grant or deny a request for a lease for a data file received from a first of the storage caches based on whether a, and what type of, lease already exists for the data file or whether the data file is already locked, wherein the decision is made in accordance with criteria that a write lease cannot be granted if a read lease already exists, only a reader right can be granted if a write lease already exists and an additional read lease can be granted if a read lease already exists; and
wherein the cache server automatically performs steps to update the cached data file at the first storage cache if a reader access right or a read lease is granted.

18. The system of claim 17, wherein the leasing module grants at least one reader right to the data file in substantially real time following the request for the lease for the data file.

19. The system of claim 17, wherein a second of the storage caches includes a cached data file into which data file modifications are entered by any of the associated second workstations, wherein the cached data file in the second storage cache is used for updating the data file stored at the file server and corresponding to the cached data file at the first storage cache to which the reader right was granted.

20. A system for managing shared access to data files stored in a file server by a plurality of authorized computer workstations, the system comprising:

a cache server for coupling to the file server; and a plurality of storage caches for accessing the data files stored in the file server by establishing a communications connection with the cache server, wherein each of the storage caches is for associating with a plurality of workstations and incorporates data file modifications entered by any of the corresponding associated workstations into the cached data file as the modifications are entered, such that the cached data file is a current version;

wherein each of the storage caches automatically transmits file update data to the cache server, wherein the file update data is a function of the modifications incorporated into the cached data file at the storage cache which make the cached data file the current version, wherein each of the storage caches includes a leasing module for controlling whether a request for access to a data file from an associated workstation should be granted or denied, wherein the access request is a request to read or write a data file stored at the file server, and wherein the leasing module performs the following steps following receipt of the request:

determining a lease condition for the data file existing at the storage cache, wherein the lease condition is one of read, write and no lease;

granting the request if the request is read and the existing lease is read or write, or if the request is write and the lease condition is write;

requesting a new lease from the cache server if the request is read and the lease condition is no lease, or if the request is write and the lease condition is read or no lease, determining at the cache server whether to grant a lease for a data file based on whether a, and what type of, lease already exists for the data file or whether the data file is already locked, wherein the decision is made in accordance with criteria that a write lease cannot be granted if a read lease already exists, only a reader right can be granted if a write lease already exists, and an additional read lease can be granted if a read lease already exists; and performing steps to automatically update the cached data file at the storage cache based on the current version of the data file stored at the file server, if a lease is granted or the request is a read and, otherwise, denying the request.

21. The system of claim 20, wherein the automatic updating steps include updating the data file stored at the file server based on a cached data file stored at one of the storage caches.

22. The system of claim 20, wherein the leasing module at a first of the storage caches performs the follows steps when the leasing module determines that a cached data file corresponding to a data file stored at the file server is no longer opened at a workstation associated with the first at storage caches:

determining whether the cached data file copy was modified based on entries made by the workstation while the cached data file was open;

if the data file copy was modified, automatically transmitting file update data to the cache server; and releasing any lease for the data file; and wherein the cache server uses the file update data to update the version of the data file stored on the file server.

23. The system of claim 22, wherein the file update is transmitted in streaming, compressed form.

24. The system of claim 22, wherein the file update is transmitted in compressed form.

25. The system of claim 20, wherein the leasing module grants at least one reader right to the data file in substantially real time following the request for the lease for the data file.

26. The system of claim 20, wherein a second of the storage caches includes a cached data file into which data file modifications are entered by any of the associated second workstations, wherein the cached data file in the second storage cache is used for updating the data file stored at the file server and corresponding to the cached data file at the first storage cache to which the reader right was granted.

* * * * *

UNITED STATES PATENT AND TRADEMARK OFFICE
CERTIFICATE OF CORRECTION

PATENT NO. : 7,103,617 B2 Page 1 of 1
APPLICATION NO. : 10/756986
DATED : September 5, 2006
INVENTOR(S) : Phatak It is certified that error appears in the above-identified patent and that said Letters Patent is hereby corrected as shown below:

Column 9, Line 12, "caches 30A and 308," should read -- caches 30A and 30B, --

Column 10, Line 49, "In step 104, The" should read -- In step 104, the --

Column 17, Line 37, "Le.," should read -- i.e., --

Column 20, Line 8, "system restarts," should read -- system restarts. --

Column 21, Line 16, "generated at least one" should read -- generated at at least one --

Column 21, Line 19, "sub-cache servers" should read -- cache servers --

Column 21, Line 22, "sub-cache server" should read -- cache server --

Column 21, Line 33, "at a fiie server" should read -- at a file server --

Signed and Sealed this

Twentieth Day of February, 2007

JON W. DUDAS
*Director of the United States Patent and Trademark Office*